(12) United States Patent
Schuster et al.

(10) Patent No.: US 6,912,457 B2
(45) Date of Patent: Jun. 28, 2005

(54) METHOD AND DEVICE FOR CONTROLLING A VEHICLE

(75) Inventors: Thomas Schuster, Brackenheim (DE); Werner Kind, Markgroeningen (DE); Rainer Mayer, Weil der Stadt (DE); Mario Kustosch, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 10/293,419

(22) Filed: Nov. 12, 2002

(65) Prior Publication Data

US 2003/0109979 A1 Jun. 12, 2003

(30) Foreign Application Priority Data

Nov. 9, 2001 (DE) .......................................... 101 55 204

(51) Int. Cl.[7] ................................................ G06G 7/76
(52) U.S. Cl. ........................... 701/70; 701/79; 701/110; 180/197
(58) Field of Search ............................... 701/53–54, 70, 701/79, 93, 110; 180/197

(56) References Cited

U.S. PATENT DOCUMENTS

| 5,351,776 | A | 10/1994 | Keller et al. | |
|---|---|---|---|---|
| 6,125,314 | A | * 9/2000 | Graf et al. | ...................... 701/53 |
| 6,208,926 | B1 | 3/2001 | Wagner et al. | |
| 6,357,839 | B1 | 3/2002 | Eckert | |
| 6,494,282 | B1 | * 12/2002 | Hessmert et al. | ........... 180/197 |

FOREIGN PATENT DOCUMENTS

| DE | 196 54 769 | 7/1998 |
|---|---|---|
| DE | 197 04 841 | 8/1998 |
| DE | 100 48 015 | 9/2000 |

OTHER PUBLICATIONS

SAE paper No. 96 10 10 "Adaptive Cruise Control, System Aspects and Development Trends," 1996, Hermann Winner, et al.*

* cited by examiner

Primary Examiner—Gertrude A. Jeanglaude
(74) Attorney, Agent, or Firm—Kenyon & Kenyon

(57) ABSTRACT

A method and a device for controlling a vehicle, in which a coordinator forms an acceleration variable for the drive train and/or a setpoint acceleration variable that is realized by the brake control, from at least two setpoint acceleration variables.

7 Claims, 4 Drawing Sheets

METHOD AND DEVICE FOR CONTROLLING A VEHICLE

FIELD OF THE INVENTION

The present invention is directed to a method and a device for controlling a vehicle.

BACKGROUND INFORMATION

European Patent No. 507 072 B1 (U.S. Pat. No. 5,351,776) relates to an electronic control system for a vehicle in which a setpoint acceleration value is derived for the longitudinal movement of the vehicle based on a vehicle-operator input and on setpoint values from driver-assistance systems, which is set by controlling the drive train or the brake system of the vehicle. Specific details for coordinating a plurality of setpoint acceleration values determined by independent systems are not given in the reference.

From the German Published Patent Application No. 100 48 015 filed on Sep. 26, 2000, a control system for a drive unit is discussed in which, on the basis of transmission output values or setpoint output torque values from different control systems, a resulting setpoint torque value for controlling the drive unit is generated, which is implemented by a corresponding conversion into controlled variables of the drive unit.

German Patent No. 196 16 732 (U.S. Pat. No. 6,208,926) discusses a system in which a setpoint deceleration value coming from the driver through an actuation of the brake pedal or from driver-assistance systems such as an adaptive cruise control is converted into a setpoint brake torque, which is implemented by actuating the brake system of the vehicle.

An adaptive cruise control (vehicle speed control including distance sensing) is discussed in SAE paper No. 96 10 10 "Adaptive Cruise Control, System Aspects and Development Trends", 1996, by Hermann Winner, Stefan Witte, Werner Uhler and Bernd Lichtenberg.

SUMMARY OF THE INVENTION

By coordination of different setpoint acceleration values for the longitudinal movement, it is possible to achieve a modular integration of different applications that influence the longitudinal movement of the vehicle.

Through the provided interface, applications acting on the longitudinal movement of the vehicle are able to be decoupled from interfaces to the engine control, transmission control or brake control, on the basis of acceleration values.

Applications acting on the longitudinal movement may be viewed together, both drive output and brake output being taken into account. Consequently, a viewing of systems for the propulsion and systems for the deceleration of the vehicle independent of one another, as it occurs in current systems, may be avoided.

This may mean that the number of interfaces to the individual systems controlling the longitudinal movement, such as the brake system, transmission control, and/or engine control, may be reduced.

The different acceleration or deceleration inputs are processed in a central coordinator into resulting acceleration inputs for the drive and into deceleration inputs for the brake system. In this manner, it may be possible to dispense with a plurality of such coordinators in individual applications that intervene both in the drive path as well as the brake path. A prioritizing and further processing of the resulting control signals of these individual application coordinators may be avoided, and thus more straightforward structures may be provided and the required work may be reduced.

DETAILED DESCRIPTION

Figure 1:
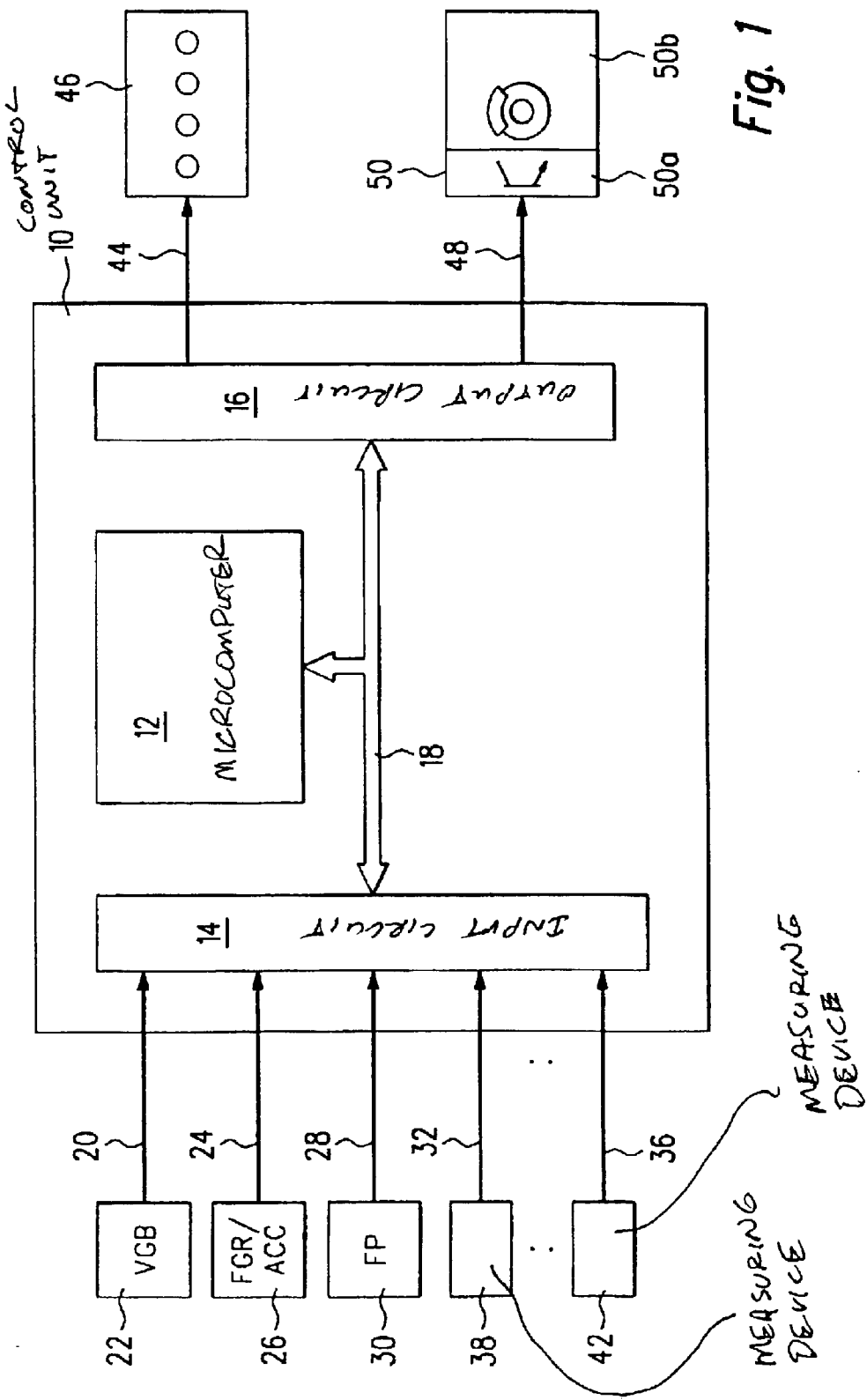
FIG. 1 shows an overall view of a control device including a central propulsion coordinator for the longitudinal vehicle movement which coordinates the inputs from various assistance systems and the driver as they pertain to longitudinal movement.

FIG. 1 shows an electronic control unit 10 which, depending on the exemplary embodiment, may be a control unit for engine control, transmission control, brake control, a central control unit of a vehicle control system or some other control unit. In the exemplary embodiment shown, control unit 10 is a control unit for controlling the drive engine, the control unit including a microcomputer 12 together with a memory, input circuit 14 and output circuit 16. These elements may be connected to one another via a communication system 18 for the exchange of data. Input lines are connected to input circuit 14, connecting control unit 10 to other control systems that influence the longitudinal movement of the vehicle, and to measuring devices for detecting operating variables of the vehicle, the drive unit, drive train or the brake system. With a view to an exemplary embodiment, a first input line 20 connects control unit 10 to a vehicle-speed limiter (VGB) 22 and an input line 24 connects control unit 10 to a driving-speed control (FGR) or an adaptive driving speed control (ACC) 26. Via an input line 28, a measuring device 30 supplies at least one variable to control unit 10, which represents the position of an operating element actuable by the driver. This operating element is an accelerator pedal, for example. Furthermore, input lines 32 to 36 are provided which connect control unit 10 to measuring devices 38 to 42. These measuring devices detect signals representing additional operating variables of the vehicle, the drive unit or the brake system. Engine speed, engine temperature, the status of auxiliary load circuits not contributing to the vehicle drive, transmission ratio in the drive train, etc. are exemplary additional operating variables.

Via output lines 44 which lead away from output circuit 16 of control unit 10, drive unit 46 of the vehicle may be controlled on the basis of controlled variables for power parameters. Moreover, a connecting line 48 provides a connection to a brake control system 50, via which a deceleration input is transmitted to control unit 50a of the brake system, which actuates brake system 50b of the vehicle. Such a brake-control system 50 is, for instance, an electro-hydraulic brake system.

In the exemplary embodiment shown, the propulsion coordinator described below is part of control unit 10, which may provide controlled variables for controlling drive unit 46 of the vehicle. In alternative exemplary embodiments, this coordinator may be part of control unit 50a of the brake system, a corresponding acceleration-input signal then being output to a control unit for controlling the drive unit of the vehicle. In other exemplary embodiments, control unit 10 may be a central control unit or a control unit of an assistance system, which detects a deceleration input for a brake-control system and/or an acceleration input for a drive system. Drive unit 46 is an internal combustion engine or an electro motor, depending on the exemplary embodiment.

Furthermore, FIG. 1 shows vehicle-speed limiter 22 or vehicle-speed control 26 as separate control units that include their own microcomputer in each case to carry out their function. In alternative exemplary embodiments, the described functions are programs of microcomputer 12, in which case only actuating signals of the driver are transmitted via the input lines, whereas the input signals of these control systems relating to longitudinal movement are present internally in microcomputer 12.

Figure 2:
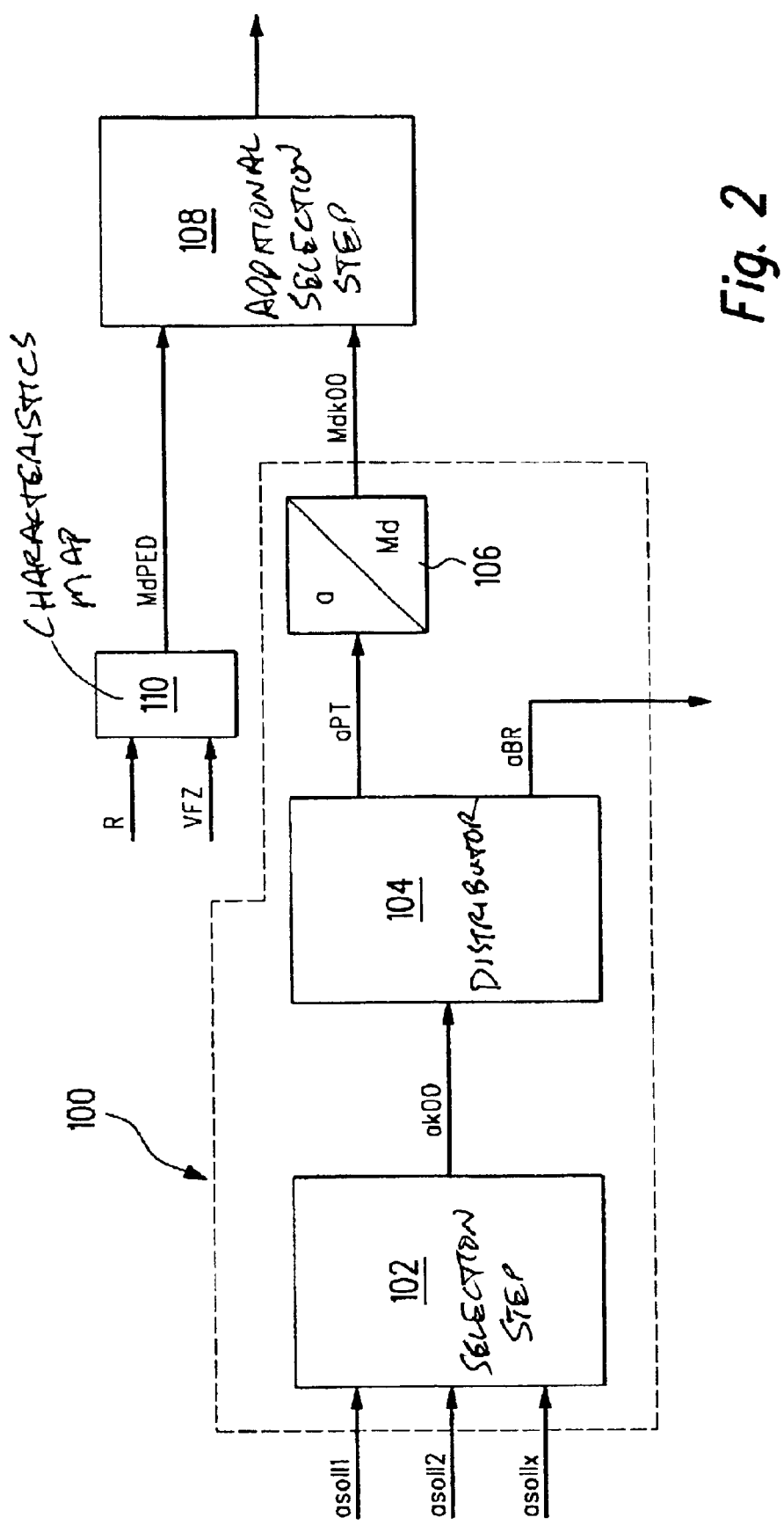
FIG. 2 shows an exemplary embodiment of a propulsion coordinator.

Via input line 28, control unit 10 may receive a variable that transmits the position of an operating element actuable by the driver, such as an accelerator pedal. A setpoint torque value may be derived therefrom, which, while being linked to other setpoint torque variables, is converted into the controlled variables for controlling the drive unit. Adaptive driving-speed control 26 may generate acceleration setpoint signals, and may transmit the setpoint acceleration to control unit 10. Corresponding setpoint signals are formed by vehicle-speed limiter 22 shown illustratively. Microcomputer 12 contains a propulsion coordinator in the form of a computer program, which coordinates all of the setpoint signals influencing the longitudinal movement, i.e. linking them to one another and generating resulting setpoint acceleration and/or deceleration signals. An example of such a longitudinal-movement coordinator is shown in the flow chart of FIG. 2. The blocks shown represent programs, program parts or program steps, while the connecting lines represent the information flow.

Coordinator 100 may be made up of a selection step 102, a distributor 104 and a converter 106 (which may not necessarily be part of the coordinator) in which the drive acceleration is converted into a transmission output torque, output torque or wheel torque.

Transmitted to selection step 102, for instance by the aforementioned control systems, are various positive or negative acceleration setpoint values asoll1, asoll2 to asollx. The selection step selects a resulting setpoint acceleration value ak00 from the supplied setpoint acceleration values, which is forwarded to distributor 104. In an exemplary embodiment, a minimal-value selection may be a suitable selection strategy, so that the resulting setpoint acceleration ak00 corresponds to the smallest of the supplied setpoint acceleration or deceleration values. Distributor 104 has the task of splitting up the resulting setpoint acceleration (positive or negative value) into a drive acceleration aPT and/or a brake deceleration aBR. Brake deceleration aBR is directly forwarded to the acceleration interface of the brake system, where it is converted within the framework of a deceleration control. In the drive context, the drive acceleration aPT is converted into a desired wheel torque Mdk00 (cf. converter 106). In an exemplary embodiment, the conversion of the acceleration into a wheel torque is carried out with the aid of the following operating-dynamics equation:

$$asoll*mfzg=FAN-FRO-FL-FST-FJ,$$

mfzg being the vehicle mass, FAN the drive force, FRO the rolling friction, FL the air drag, FST the tractive resistance due to the downgrade force, and FJ the inertia moment. The mentioned variables of the operating-dynamics equation are calculated, adapted, measured and assumed to be constant. Thus, for example, the vehicle mass is measured by an appropriate sensor, assumed to be constant or adapted by estimation method. In an exemplary embodiment, the setpoint wheel torque, the setpoint transmission output torque or the setpoint drive force are calculated from the setpoint acceleration by an estimated value, which is formed iteratively and takes the other variables into account. For this purpose, the instantaneous acceleration is determined from the instantaneous speed by time derivative. Taking the vehicle mass into account, the instantaneous drive force is determined. This instantaneous value is deducted from the setpoint drive force, formed from the setpoint acceleration and vehicle mass, corrected by the estimated value. On the basis of the difference, which is filtered, if appropriate, the estimated value is formed, which is then applied to the force variable derived from the setpoint acceleration and mass, in order to generate the setpoint drive force. In an exemplary embodiment, the air drag is calculated as a function of the vehicle speed and taken into account as a separate variable.

In this manner, a setpoint wheel torque Mdk00 is determined in converter 106 from setpoint acceleration aPT for the drive train. This setpoint wheel torque is supplied to an additional selection step 108. In this selection step, a resulting wheel torque is determined from the supplied setpoint wheel torques which, in the example shown in FIG. 2, consist of setpoint wheel torque Mdk00 of coordinator 100 and of driver input torque MdPED. The latter is derived from accelerator-pedal position β and vehicle speed VFZ, for instance, with the aid of a characteristics map 110.

In an exemplary embodiment, selection step 108 is a maximal value selection step, i.e., the resulting setpoint torque is the larger of the two values supplied. In alternative exemplary embodiments, setpoint torques discussed in the related art are used additionally in the coordination of the setpoint torques.

Figure 3:
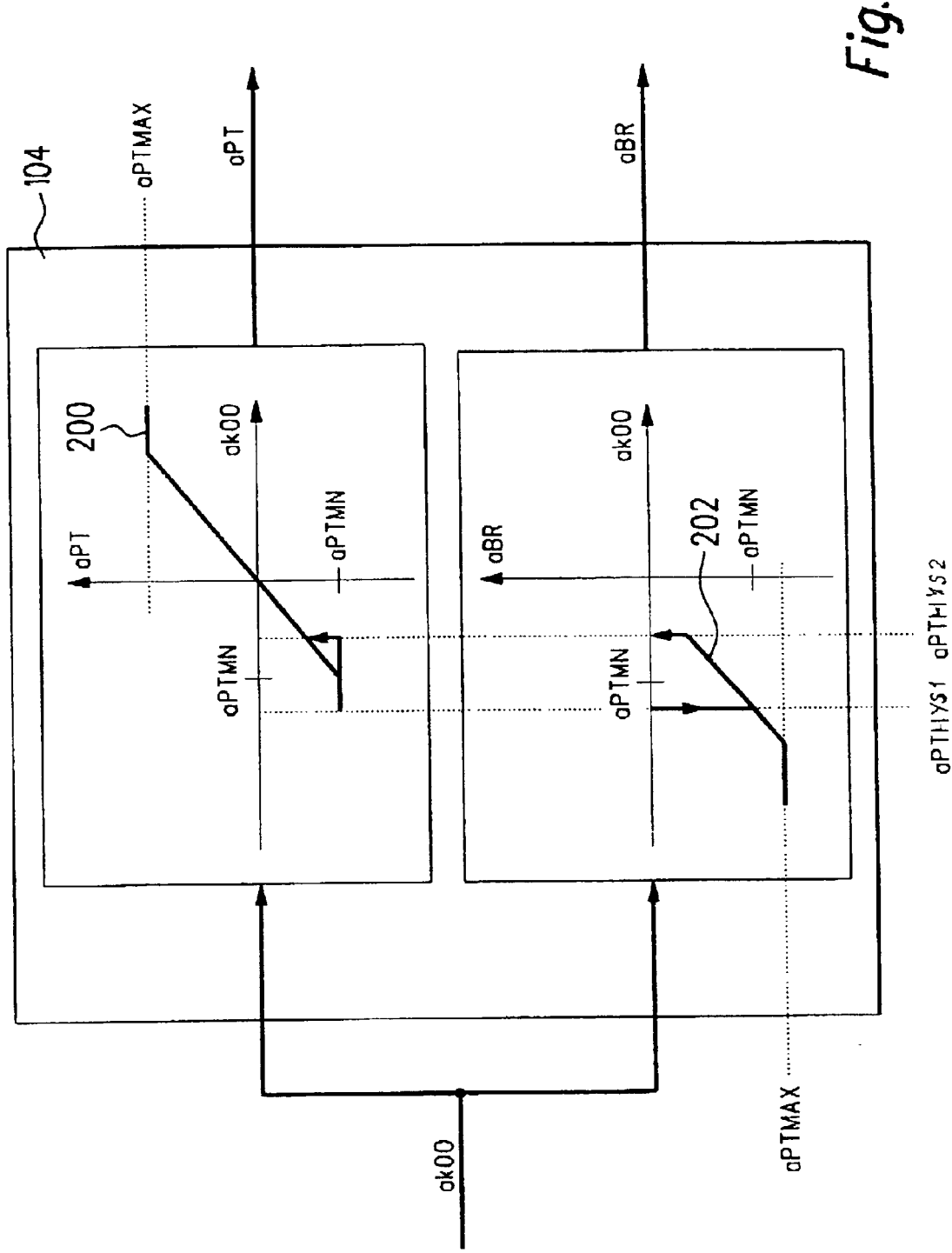
FIG. 3 describes an exemplary embodiment for the division of a resulting acceleration input among the drive path and brake path.

An exemplary embodiment of distributor 104 is shown in the flow chart of FIG. 3. In this situation, distributor 104 encompasses two characteristic curves 200 and 202. The resulting acceleration request ak00 is supplied to the characteristics curves. In characteristics curve 200, setpoint drive acceleration aPT is plotted over the resulting acceleration ak00, while in characteristics curve 202 the setpoint deceleration aBR is plotted over the resulting acceleration ak00. The characteristics curves of the exemplary embodiment are in each case limited lines through the origin. The limitings are attributable to the maximal drive output and the maximal braking force. For instance, the drive, by providing a drag torque of the drive unit, can provide a minimal deceleration aPTMN. In addition to providing the drag torque of the internal combustion engine, an additional deceleration is generated in an exemplary embodiment by actuating auxiliary load circuits loading from the drive unit, such as an air-condition system, rear-window heater, starter generator etc., and taken into account when determining the minimal acceleration aPTMN. That is, minimal drive train acceleration aPTMN is specified as a function of the operating state of the drive unit and/or the operating state of the auxiliary load circuits, and is, for instance, determined from characteristics curves.

For example, in low-load ranges or at low rotational speed, the deceleration able to be set by the drive unit is lower than at higher rotational speeds.

A maximal limiting of characteristics curve 200 produces the maximally possible drive output, which is determined from the maximally possible drive force.

Conversely, characteristics curve 202 is limited with respect to deceleration values by the maximal deceleration that may be set at maximal brake pressure of the brake system. That is, if a deceleration that is above the maximal deceleration aPTMN of the drive unit is requested as the resulting desired acceleration, it is implemented by specifying the setpoint power train acceleration. However, if the requested deceleration is greater than the maximal drive deceleration, a brake intervention may be necessary, which is implemented in parallel with the generation of the drag torque by the engine.

In an exemplary embodiment, brake intervention and drive control are debounced from one another by a hysteresis. This hysteresis is shown as an example in the flow chart of FIG. 3.

The maximal deceleration by the drive unit is also a function of operating variables and is specified, for example, by the gear selected and the load of the auxiliary load circuits.

In an exemplary embodiment, distributor 104 is made up of the characteristics curves represented above, which are shown as lines through origin. Depending on the exemplary embodiment, other implementations may be found, for instance, within the framework of calculation processes or in connection with characteristics curves that have some other dependency of the setpoint accelerations from the resulting setpoint acceleration, such as a dependency deviating from the straight-line dependency.

Figure 4:
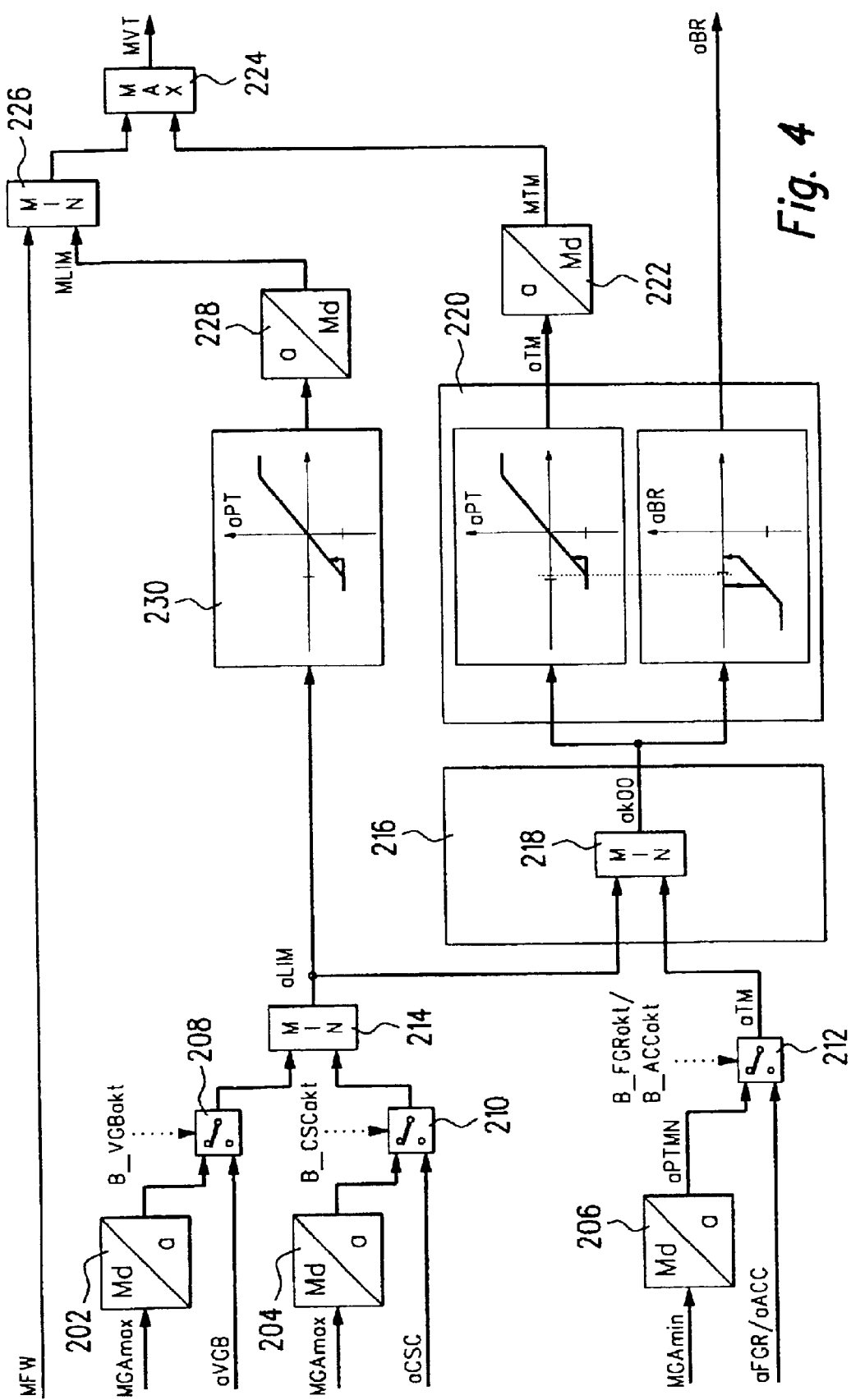
FIG. 4 shows a flow chart, which represents an exemplary embodiment of a central propulsion coordinator.

FIG. 4 shows a flow chart for another exemplary embodiment of a propulsion coordination. The individual blocks are programs, program parts or program steps, while the connecting lines represent the information flow.

In the exemplary embodiment of FIG. 4, all drive inputs are processed in a central coordinator. These inputs may be classified as follows: the driver input, which is expressed by actuating the accelerator pedal; requests for limiting the forward movement, such as the request from a variable driving-speed limiter, a maximal driving speed limiter, an automatic emergency braking etc.; and drive inputs that may result in acceleration as well as deceleration, such as an adaptive driving-speed control, a vehicle-speed control with brake intervention or possibly an intelligent parking pilot.

As input variables, the propulsive-power coordinator shown in FIG. 4 may be supplied with a driver-input torque MFW formed as a function of the accelerator pedal position, with setpoint accelerations of a driving-speed limiter aVGB, if present, a curve-speed limiter aCSC, a vehicle-speed control or adaptive driving-speed control aFGR or aACC, a variable for the maximally possible transmission output torque MGAMAX, a variable for the minimally possible transmission output torque MGAMIN, as well as signals representing the active operating state of driving-speed limiter B_VGBakt, curve-speed limiter B_CSCakt, vehicle-speed control B_FGRakt and/or the adaptive driving-speed control B_ACCakt.

The maximally possible transmission output torque MGAMAX is formed as a function of, for instance, the rotational speed of the drive unit, the gear ratio in the drive train, etc. A maximally possible drive train acceleration aPTMX, which is used as the basis in the distributor, is derived therefrom as well. The minimally possible output torque MGAMIN is calculated from a correction value of an idle-speed control, the loss torques of the drive unit that are not used for driving, etc. In the decelerating operating state, this minimally possible torque corresponds to the negative value of the loss torque, i.e., the portion that the engine must generate to overcome its internal friction and/or to operate auxiliary load circuits that do not contribute to the driving.

The conversion of torques (M) or forces into accelerations is implemented using the afore-described correlation. Within the framework of converters 202, 204 and 206, which in the exemplary embodiment work on the basis of the operating-dynamics equation (MFZG*a=M/UA−FRO−FZ−FST−FJ−FBR), as mentioned above, the maximal drive-train acceleration aPTMAX is formed from the maximal transmission output torque, and the minimal drive-train acceleration aPTMN is formed from the minimal transmission output torque.

In the previously described equation, M constitutes the transmission output torque, UA the transmission ratio of the differential gear and the wheel, and FBR the braking force. These variables are provided by the appropriate control systems, M by the engine control, UA by a transmission control or the engine control subject to observing rotational speed and speed, FBR by the brake control.

The maximally possible drive acceleration is supplied to a switching element 208, to which the setpoint acceleration of driving-speed limiter aVGB is forwarded as well. Correspondingly, the maximally possible drive acceleration formed in 204 is supplied to switching element 210, which is also provided, if available, with setpoint acceleration aCSC of the curve-speed limiter. The minimal drive acceleration formed in 206 is supplied to a switching element 212, which is also supplied with the setpoint acceleration value of vehicle-speed control aFGR or of adaptive cruise control aACC, if installed. If the respective assistance system is not active or not installed, switching elements 208 through 212 are in the position shown, so that maximal or minimal acceleration values are processed further in each case. If one of the systems is active, the appropriate switching element switches to the other position, so that the respective setpoint acceleration is processed further. Inputs used to limit the forward movement, such as the setpoint accelerations of the driving-speed limiter and the curve-speed limiter, are supplied to a minimal-value selection step 214. The smaller of the two setpoint values then forms a setpoint limiting acceleration aLIM. If none of the limiting systems is present, the maximally possible drive acceleration is specified as limiting acceleration aLIM, so that this area of the coordinator does not influence the further determination of the setpoint values. Limiting setpoint value aLIM is supplied to selection step 216 which in the exemplary embodiment consists of minimal-value selection step 218. The second variable supplied to this minimal selection step is acceleration a™, which is selected from the setpoint acceleration of a propulsion-input, which may result both in an acceleration as well as a deceleration. Here, too, it holds that, given an inactive or a non-existing application, minimal drag acceleration aPTMN is specified as setpoint acceleration aTM, so that, as can be seen below, this interface also has no influence on the specification of the setpoint torques. In minimal-value selection step 218, the smaller of the supplied setpoint-acceleration values is selected as resulting setpoint-acceleration value aK00. It is forwarded to distributor 220, which may correspond to the design approach represented with the aid of the exemplary embodiment of FIG. 3.

In the exemplary embodiment, in addition to the minimal-value selection step, selection step 206 includes further additional functionalities, such as a gradient limitation of the acceleration, for instance, for smoothing the transitions. In this context, only a maximal change of the acceleration setpoint value may be permitted. Changes of the acceleration setpoint value going beyond it may have no effect.

As described above, a setpoint acceleration aBR for the deceleration systems, such as a brake control, as well as an acceleration aTM for the drive are determined in distributor 220. The former is transmitted via an interface to a brake control system, while the setpoint drive acceleration is converted in a converter 222 into a setpoint drive torque MTM, possibly a setpoint wheel torque or a setpoint gear output torque. For this purpose, the afore-mentioned equation is used, for example.

The setpoint drive torque MTM is supplied to a maximal value selection step 224. This maximal value selection step is to ensure the overriding of the vehicle-speed control input by the driver. If the driver input coming from minimal-value selection step 226 is greater than the setpoint torque variable detected in converter 222, it is output as drive setpoint torque MVT for further processing; otherwise it is the setpoint torque variable from converter 222. Minimal-value selection step 226 is provided to limit the driver target torque, the driver target torque being limited as a function of the limiting systems driving-speed limiter, curve-speed limiter. In FIG. 4, this is realized in such a way that a limiting torque MLIM is supplied as second input variable of minimal-value selection step 226, which is formed in converter 228 from a drive setpoint acceleration. This, in turn, is detected from the limit acceleration aLIM as specified by a characteristics line 230. This characteristics line corresponds to the drive branch of distributor 220, which guarantees acceleration values that the drive train is able to realize.

It may be distinguished among the following cases:

MFW>MLIM>MTM

This has the result that the setpoint drive torque MVT is the setpoint limiting torque MLIM. Therefore, the driver overrides the vehicle-speed control and is limited in doing so.

MLIM>MTM>MFW

This has the result that the drive request MVT is formed by the torque value MTM, i.e., the vehicle-speed control prevails against the driver input; there is no limiting.

MTM>MFW>MLIM

This means that the drive setpoint torque MVT corresponds to the limiting setpoint torque MLIM. Both the driver input as well as the input of the vehicle-speed control are limited.

MLIM>MFW>MTM

This means that the drive input MVT is formed by the driver input MFW. The driver overrides the vehicle-speed control; there is no limiting.

MTM>MLIM>MFW

The drive input MVT corresponds to limiting torque MLIM. The vehicle-speed control prevails against the driver input and is limited.

If no driver input exists and the vehicle-speed control requests a braking intervention, the setpoint deceleration aBR is specified by the setpoint value aTM of the vehicle-speed control, whereas as drive input MVT the minimally possible drive input MGAMIN, which is formed from the minimally possible acceleration APTMN, results.

When a driver input overrides a brake intervention of the vehicle-speed control, the driver input MFW results as setpoint drive torque MVT, while the setpoint deceleration aBR=zero. This requires that the vehicle-speed control detects the override by the driver input and discontinues the brake intervention. Given a driver input and given a brake intervention, a corresponding information is to be output to the vehicle-speed control.

A brake intervention by the limiter results in a setpoint deceleration aBR, which corresponds to setpoint limiting deceleration aLIM, while the setpoint drive torque, as in the first case mentioned, corresponds to the minimally possible gear output torque MGAMIN.

What is claimed is:

1. A method for controlling a vehicle, comprising:
   selecting a setpoint value by a coordinator from at least two setpoint values representing an acceleration of the vehicle;
   controlling at least one of a drive unit of the vehicle and a brake system of the vehicle based on the setpoint value;
   subjecting the at least two setpoint values to a minimal-value selection to form a resulting acceleration setpoint value;
   supplying the resulting acceleration setpoint value to a distributor; and
   converting the resulting acceleration setpoint value in the distributor into a first acceleration setpoint value for a drive-train control and a second acceleration setpoint value for a brake control.

2. The method as recited in claim 1, wherein the at least two setpoint values originate from at least one of a driving-speed limiter, a vehicle speed control, and a curve-speed limiter.

3. The method as recited in claim 1, wherein the distributor includes a first assignment of the resulting acceleration setpoint value to the first acceleration setpoint value and a second assignment of the resulting acceleration setpoint value to the second acceleration setpoint value.

4. The method as recited in claim 3, wherein the first assignment and the second assignment are selected so that an acceleration input is provided by controlling a drive train for as long as the drive train does not set a maximal drag torque.

5. The method as recited in claim 3, wherein the first assignment and the second assignment are lines through an origin, the first assignment and the second assignment being limited to a plurality of maximal values and a plurality of minimal values.

6. The method as recited in claim 1, wherein:
   a first acceleration setpoint variable is an acceleration setpoint variable of a vehicle-speed control; and
   a second acceleration setpoint variable is a setpoint variable that is selected from at least one limiting function.

7. A method for controlling a vehicle, comprising:
   selecting a setpoint value by a coordinator from at least two setpoint values representing an acceleration of the vehicle;
   controlling at least one of a drive unit of the vehicle and a brake system of the vehicle based on the setpoint value; wherein:
   a first acceleration setpoint variable is an acceleration setpoint variable of a vehicle-speed control;
   a second acceleration setpoint variable is a setpoint variable that is selected from at least one limiting function; and
   a setpoint acceleration of the at least one limiting function and a drive acceleration of a coordination are each converted into at least one setpoint torque, the at least one setpoint torque being linked to a driver input torque to form a resulting setpoint drive torque.

* * * * *